United States Patent
Martin et al.

[11] Patent Number: 5,958,245
[45] Date of Patent: *Sep. 28, 1999

[54] METHOD FOR REGENERATING SEASONED AQUEOUS FIXING OR BLEACH/FIXING SOLUTIONS

[75] Inventors: Didier J. Martin, Givry; Christian G. Guizard, Montpellier; Jean-Francois Diaz, Assas, all of France

[73] Assignee: Eastman Kodak Company, Rochester, N.Y.

[*] Notice: This patent is subject to a terminal disclaimer.

[21] Appl. No.: 08/841,226

[22] Filed: Apr. 29, 1997

[30] Foreign Application Priority Data

Apr. 29, 1996 [FR] France .................................. 96 05593

[51] Int. Cl.$^6$ ........................................................ B01D 61/00
[52] U.S. Cl. ........................ 210/652; 210/651; 430/400; 430/398
[58] Field of Search ........................ 210/652, 651, 210/195.2, 257.2; 430/400, 398

[56] References Cited

U.S. PATENT DOCUMENTS

| | | | |
|---|---|---|---|
| 3,925,175 | 12/1975 | Fisch et al. | 204/109 |
| 4,341,629 | 7/1982 | Uhlinger | 210/138 |
| 5,219,717 | 6/1993 | Schmittou et al. | 430/398 |
| 5,607,592 | 3/1997 | Bernard et al. | 210/641 |
| 5,679,503 | 10/1997 | Martin et al. | 430/400 |

FOREIGN PATENT DOCUMENTS

| | | |
|---|---|---|
| 2044107 | 12/1992 | Canada . |
| 0 348 532 | 1/1990 | European Pat. Off. . |
| 0 687 496 | 12/1995 | European Pat. Off. . |
| 0 762 200 A1 | 8/1996 | European Pat. Off. . |
| 2 684 024 | 5/1993 | France . |
| 92/14539 | 9/1992 | WIPO . |

OTHER PUBLICATIONS

Mulder, M., "Basic Principles of Membrane Technology", 1990, pp. 334–336, Kluwer Academic Publishers.

*Primary Examiner*—Ana Fortuna
*Attorney, Agent, or Firm*—J. Lanny Tucker

[57] ABSTRACT

The invention concerns a method and a device for the selective extraction of the halide ions from photographic baths. According to the invention, the solutions to be treated are subjected to a first nanofiltration step 2 in diafiltration mode, then to a second nanofiltration step 3 in concentration mode. The method makes it possible to prolong the activity of the fixing or bleaching/fixing baths during the processing of photographic products.

12 Claims, 3 Drawing Sheets

METHOD FOR REGENERATING SEASONED AQUEOUS FIXING OR BLEACH/FIXING SOLUTIONS

FIELD OF THE INVENTION

The present invention concerns a method and a device for extracting the halide ions from photographic fixing or bleaching/fixing solutions used in processing silver-halide photographic products.

More particularly, the invention makes it possible to eliminate iodide and bromide ions from aqueous fixing or bleaching/fixing solutions mainly containing thiosulphate as a fixing agent by bringing the fixing solution into contact with nanofiltration membranes.

BACKGROUND OF THE INVENTION

The present invention also concerns a method of processing silver-halide photographic products comprising a step in which the fixing or bleaching/fixing solution is treated continuously or discontinuously in order to eliminate the majority of the halide ions by means of nanofiltration membranes and in order to maintain an acceptable level of halide ions in the fixing solution during the entire processing period.

The basic method of obtaining a silver-halide photograph consists of exposing a silver-halide photographic product to actinic radiation which produces an image rendered visible by chemical processing. The fundamental steps of this treatment comprise, firstly, the treatment of the product with a developing solution in which a part of the silver halides is converted into metallic silver.

In order to obtain black and white images it is necessary to eliminate the undeveloped silver halides and in order to obtain a color image it is necessary to eliminate all the silver from the photographic product after the image has been formed. In black and white photography, the elimination of the undeveloped silver halides is achieved by dissolving them in a solvent for silver halides called a fixative and used in a fixing bath. In color photography, the elimination of the silver is achieved by oxidizing the metallic silver and dissolving the oxidized metallic silver and undeveloped silver halides. The oxidation of the metallic silver is achieved by means of a bleaching agent and the dissolution of the oxidized silver and the undeveloped silver halides is achieved by means of a fixing bath. The two operations can be combined by using a bleaching/fixing bath. In the remainder of the description, the term "fixing solution" will indiscriminately designate seasoned or used fixing or bleaching/fixing baths, that is to say those having already been used for fixing a certain quantity of photographic products.

It is extremely desirable to process the photographic products as quickly as possible. In particular, the fixing step should be as short as possible. During processing, reaction products accumulate in the fixing solutions. These products, largely dissolved silver and halide ions, slow down the fixing reaction and make the fixing solution less effective. To remedy this, the exhausted solution is reactivated by adding a regenerative solution after a certain quantity of photographic product has been processed. This does not prevent unwanted substances from accumulating in the processing solution, so that, finally, the activity of the solution can no longer be regenerated by adding fresh liquid. In practice, when the regenerative solution is introduced into the processing tank an equivalent quantity of exhausted solution is discharged by means of an overflow. In order to reduce the concentration of unwanted substances it is necessary to discharge a very large quantity of exhausted processing solution.

Furthermore, in order to produce the least possible pollution it is necessary to use quantities of chemical products which are as small as possible. One way of reducing the quantities of effluents discharged is to use low regeneration rates in the processing solutions, which makes it possible to reduce the volume of solution discharged via the overflow into the drainage system. If the regeneration rates are lowered, the concentrations of silver and halides increase again and the retarding effect is accentuated. Further, the problem of residual tints is posed, together with the fixing difficulties which results therefrom. Low regeneration rates can therefore be used only if unwanted substances are eliminated from the fixing solutions.

The degree of fixing can be improved and the volume of effluents reduced by eliminating the silver from used fixing solutions by chemical or electrochemical means. In practice, the concentration of silver ions is maintained at between 0.5 g/l and 1 g/l. However, these treatments do not eliminate the halide ions and in particular the iodide ions, which have a very considerable retarding effect. The increase in the concentration of bromide ions in the fixing solution does not pose any particular problem as the bromide ions have little influence on the kinetics of fixing.

Thus, if it were possible to eliminate the iodide ions from fixing solutions it would be possible to achieve faster fixing and this would prolong the life of the fixing solution whilst still using low regeneration rates.

The elimination of halide ions from the fixing solution is rendered difficult by the presence of other compounds in the solution, such as thiosulphate, sulphites and silver in chelated form. It is not desirable to eliminate the thiosulphate or sulphite ions, which are the active fixing agents. Unfortunately, numerous methods which could eliminate the iodide ions, such as oxidation, chelation and ion exchange interfere with these other anions. The sulphite and thiosulphate ions are easily oxidized. Numerous substances which precipitate or complex with the iodide ions also react with the thiosulphate ions. Anion exchange resins extract both iodide ions and thiosulphate ions.

Furthermore, the problem of eliminating iodide ions is rendered more difficult by the high concentration of compounds which are capable of interfering. The thiosulphate ions are generally present in a concentration of between 0.1 and 2.0 mol/l. The sulphite ions are present in a concentration of between 0.01 and 1 mol/l. The concentration of iodide ions should be kept below 0.05 mol/l, and preferably below 0.005 mol/l. This is why it is essential that the system of eliminating iodide ions be extremely selective, in particular with regard to thiosulphate ions.

U.S. Pat. No. 3,925,175 describes the elimination of silver and halide ions by causing the fixing solution to pass through the cathodic compartment of an electrolytic cell. The electrolytic cell comprises a semi-permeable membrane separating the anode and the cathode and also a solution of electro-active oxidizable substances in the anodic compartment. However, such semi-permeable membranes are expensive and easily clogged by the compounds in solution, which makes them ineffective for separation after a short time. In addition, this method requires electrical equipment and consumes electricity, which increases the cost and the complexity of the separation.

European Patent Application 0 348 532 describes a method in which the fixing solution is brought into contact with an ion exchange resin in order to accelerate the fixing of the photographic product containing silver iodide and to reduce the quantity of discharged effluents. However, either these resins eliminate ions other than the iodide ions, such as thiosulphate, sulphite and sequestered silver ions, or they cannot be used for eliminating the iodide ions in solutions containing numerous other anionic compounds.

German Patent DE-A-4 236 713 suggests the use of nanofiltration, or nanofiltration in combination with ultrafiltration, for separating the compounds dissolved in the washing water of the bleaching/fixing step of photographic processing. A first step, at a high flow rate and low concentration, makes it possible to recover the clean water, which can be recycled into the rinsing tanks. A second step, at a low flow rate and high concentration, enables the fixing compounds present to be reconcentrated in the washing water so as to produce an aqueous photographic solution which can be used for fixing or bleaching/fixing.

U.S. Pat. No. 5,219,717 describes a method for selectively eliminating the iodide ions in fixing and bleaching/fixing baths in which an anionic surfactant, a medium absorbing the iodide and a polymer are used, the anionic surfactant having the opposite charge to that of the polymer. For example, the absorbent medium can be silver bromide and the polymer a copolymer of methacrylate, methacrylamide, acrylate or acrylamide. This very selective method enables the iodide ions to be eliminated without changing the thiosulphate concentration. However, the method is difficult to implement as a polymer support band covered with the compound absorbing the iodide ions and with the surfactant must be made to circulate in the vessel containing the fixing solution.

EP-A-0 407 979 suggests the use of a technology involving reverse osmosis for regenerating and recycling washing water or fixing solutions.

U.S. Ser. No. 08/691,198, filed Aug. 7, 1996; entitled "Method and Device for the Selective Extraction of Halide Ions from Photographic Baths", by Didier J. Martin, Jean-Francois Diaz, and Christian G. Guizard, describes the regenerating and of a fixing solution using two nanofiltration steps. In a first step a preliminary separation is effected by subjecting the fixing or bleaching/fixing solution to a first step of nanofiltration through a tubular membrane used in concentration mode. The permeate produced in this first step is subjected to a second step of nanofiltration through a spiral membrane used in diafiltration mode.

The approach described in the application mentioned above, even if it partly resolves the problems outlined above, is not completely satisfactory. This is because it allows only around 50% of the halide ions to be extracted from the bleaching or bleaching/fixing solution. In addition, it involves the use of two different types of nanofiltration membrane, which substantially increases the cost of implementing the method. Finally, according to this method, the loss of concentration of thiosulphate is in any case around 10%. In addition, it is not possible to concentrate the fixing solution with regard to thiosulphate ions.

This is why it is desirable to have available a method which is simple to implement and which enables the problems discussed above with reference to the prior art to be substantially resolved.

SUMMARY OF THE INVENTION

This problem is resolved with the method according to the present invention for selectively separating the halide ions of aqueous photographic fixing or bleaching/fixing solutions from other substances in solution, a method in which the solution is passed through at least one nanofiltration module, forming a permeate and retentate, characterized in that it comprises the following steps:

a) diluting the solution with a volume of water between 0.1 and 10 times the volume of the solution;

b) subjecting the fixing or bleaching/fixing solution to a first step of nanofiltration in diafiltration mode, at a low flow rate and concentration factor, so as to form a retentate with a high concentration of the said other substances and low in halide ions, and a permeate with a high concentration of halide ions and low in the said other substances; and c) subjecting the permeate produced by the first nanofiltration step to a second nanofiltration step, in concentration mode, at a flow rate and concentration factor higher than those used in b), so as to form a retentate with a high concentration of the said other substances and low in halide ions and a permeate substantially containing none of the said other substances.

The invention also concerns a device for selectively separating the halide ions in aqueous photographic fixing or bleaching/fixing solutions from the other substances in solution, and in which the solution passes through at least one nanofiltration module, forming a permeate and a retentate, characterized in that it comprises:

a) means for diluting the solution with a volume of water between 0.1 and 10 times the volume of the solution;

b) means for subjecting the fixing or bleaching/fixing solution to a first step of nanofiltration in diafiltration mode, at a low flow rate and concentration factor, so as to form a retentate with a high concentration of the said other substances and low in halide ions, and a permeate with a high concentration of halide ions and low in the said other substances; and c) means for subjecting the permeate produced by the first nanofiltration step to a second nanofiltration step, in concentration mode, at a flow rate and concentration factor higher than those used in b), so as to form a retentate with a high concentration of the said other substances and low in halide ions, and a permeate substantially containing none of the said other substances.

According to another aspect of the present invention a method of processing silver-halide photographic products is likewise implemented comprising a development step, a fixing step or a bleaching/fixing step, and at least one washing step, the said processing method being characterized in that the aqueous photographic solution used in the fixing or bleaching/fixing step is treated by means of the separation method according to the invention.

BRIEF DESCRIPTION OF THE DRAWINGS

During the course of the description which follows, reference will be made to the drawing in which.

DETAILED DESCRIPTION OF THE INVENTION

Figure 1:
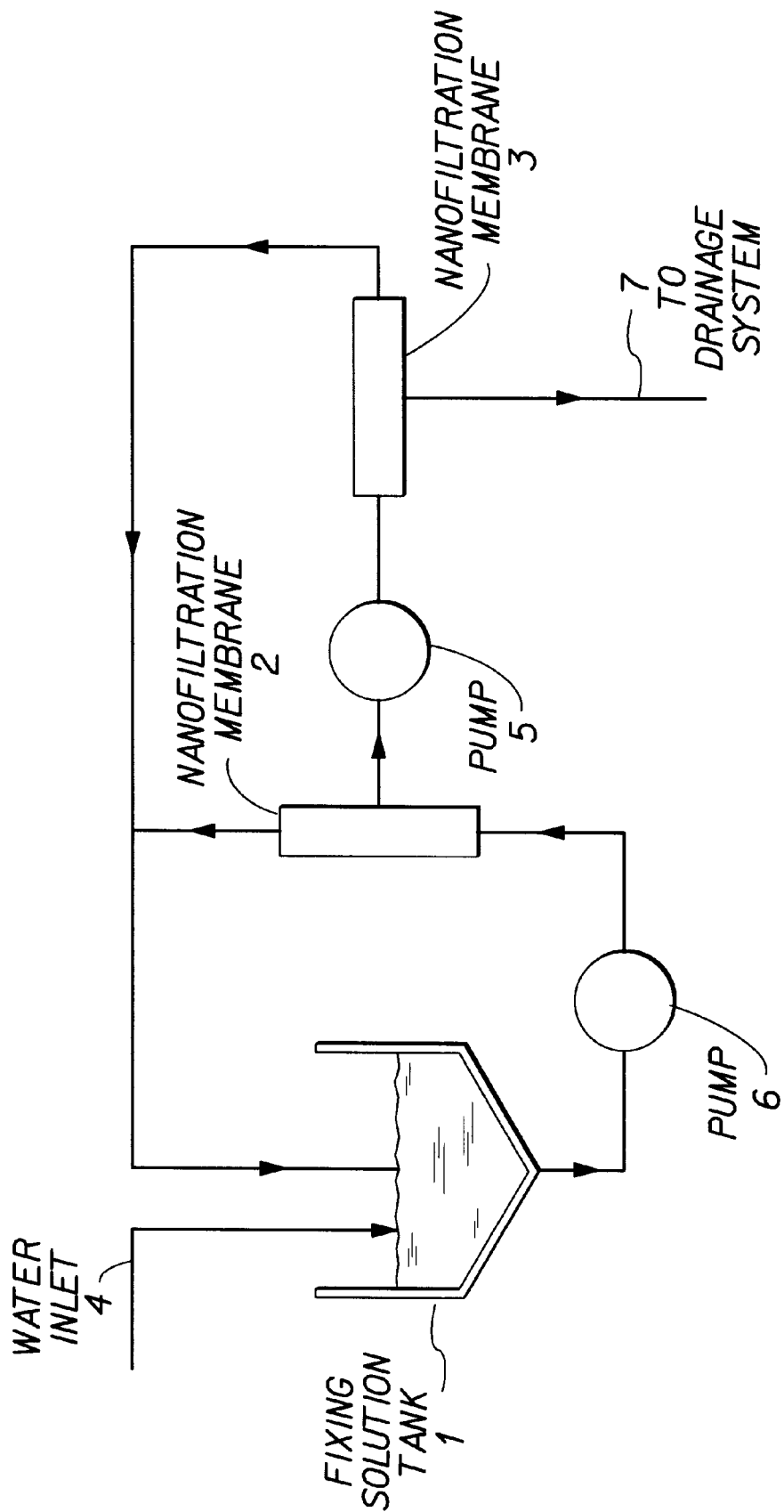
FIG. 1 depicts a first embodiment of the device according to the present invention, used for continuously extracting the halide ions from fixing solutions.

Nanofiltration is a technique used for the selective separation of soluble salts and organic compounds in solution; it enables substances having a molecular weight between 200 and 1,000 to be separated. It is a technique based on the phenomena of diffusion and convection through a porous membrane having a pore size of around 1 nanometer. The solution which has passed through the membrane is called a filtrate or permeate, and the solution which is retained by the membrane is called a concentrate or retentate.

The nanofiltration membranes can be inorganic or organic. Organic membranes are membranes based on cellulose acetate, poly(amide/imide), polysulphone, acrylic polymers or fluorinated polymers. Inorganic membranes are membranes based on carbon, ceramics, anodized aluminum, sintered metal, porous glass or woven composite based on carbon fibers.

For use the membranes have to be mounted in supports called modules. There are principally two types of module: tubular modules and spiral modules.

The tubular modules, referred to hereinafter as a "tubular membrane", are formed from hollow, porous tubes, to which the semi-permeable membrane is fixed. The solution flows inside the tube. The tubes can be placed either in series or in parallel.

The spiral modules, referred to hereinafter as a "spiral membrane", comprise a flat membrane wound around a perforated hollow tube designed to collect the permeate. A plastic grid is placed between the membranes to separate them and to create turbulence in the flow of fluid. In order to be able to exert the requisite pressure on the liquid to be treated, the membrane coils are inserted in tubular pressure chambers with a system of joints at the ends.

According to the invention, spiral modules are used in preference.

The membranes can be used in "concentration" mode or "diafiltration" mode. In "concentration" mode, the permeate is discharged and the retentate is recycled. The solution to be treated becomes more and more concentrated as treatment continues. In "diafiltration" mode, the solution to be treated is diluted to compensate at least partly for the loss of the permeate. It is possible to introduce, for example, a quantity of water from 0.1 to 10 times the quantity of discharged permeate.

The separation activity of the membrane is characterized by the ion retention level. The retention level for an x ion ($Rr_x$) is calculated from the concentrations of this x ion in the permeate ($[Xp]$) and in the retentate ($[X_r]$) according to the formula:

$$Rr_x = [1-([X_p]/[X_r])]*100$$

A positive retention level indicates that the majority of the x ions are retained in the membrane, a negative retention level that the majority of the x ions pass through the membrane.

The retention levels and the flow of permeate generally vary over time.

In the present invention, the solution is subjected to two nanofiltration steps. For this purpose, use can be made of two separate membranes, each membrane forming part of a separate recirculation loop, or a single membrane through which two successive passes are made. The first membrane effects a first separation of the halide ions, operating at a low flow rate and concentration factor. The second membrane allows separation operating at a higher flow rate and concentration factor than those used for the first membrane.

According to the invention, the first membrane is used in "diafiltration" mode, diluting the fixing or bleaching/fixing solution, prior to passage through the first membrane, with a volume of water between 0.1 and 10 times the volume of solution to be treated. The operation should preferably be carried out at a constant volume, the quantity of water added making up exactly the volume of solution. This quantity of water can be added continuously or else all at once. The second membrane is used in "concentration" mode.

A first embodiment of the device according to the invention for continuously extracting the halide ions from fixing solutions is depicted in FIG. 1.

The used fixing bath coming from the overflow of the processing machine, after passing through a device, for example, an electrolytic device (not depicted) for eliminating the silver ions, is transferred to the tank 1 where the fixing or bleaching/fixing solution is diluted, before it passes into the first membrane, with a volume of water between 0.1 and 10 times the volume of solution to be treated. According to another embodiment, the electrolysis operation is effected afterwards.

Advantageously, the fixing or bleaching/fixing solution is diluted using the water from (inlet 4) the washing steps of the photographic processing operation, treated beforehand through a nanofiltration membrane in concentration mode at a high flow rate. By means of a pump 6 it is then directed to the first nanofiltration membrane 2. The first membrane 2 is a spiral organic membrane having a surface area of 2.21 m$^2$. The retentate from the first membrane is sent back to the tank containing the fixing bath 1 and the permeate is directed to a second nanofiltration membrane 3 by means of a pump 5. The second membrane 3 is a tubular organic membrane having a surface area of 2.21 m$^2$. The permeate from the second membrane 3 is discharged into the drainage system 7 and the retentate is sent back to the tank containing the fixing bath 1.

This embodiment makes it possible to maintain an acceptable level of halide ions in the fixing solution during the entire processing period while using low regeneration rates. For example, the evaporation factor is compensated for.

Figure 2:
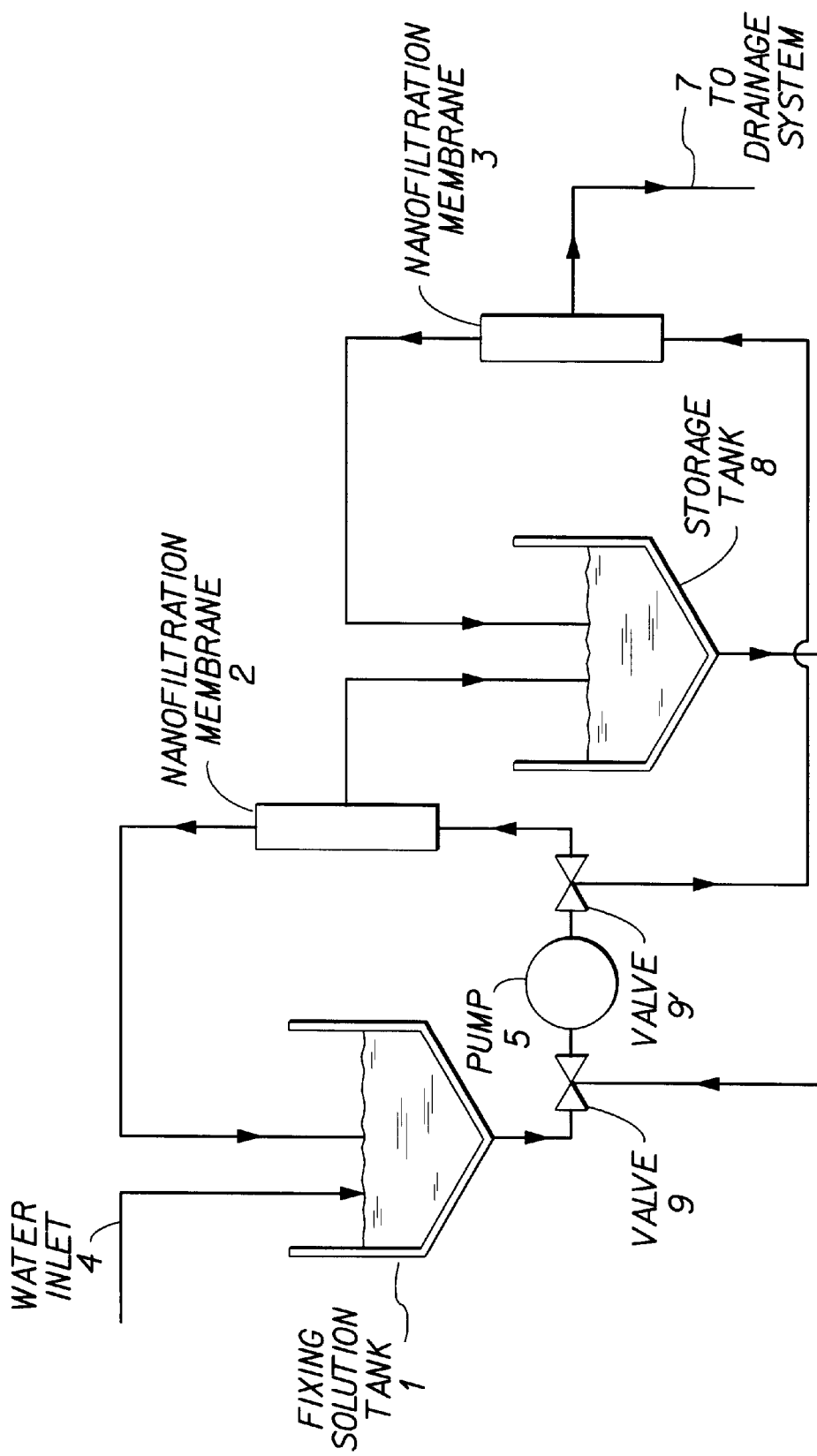
FIG. 2 depicts a second embodiment of the device according to the present invention, used for discontinuously extracting the halide ions from fixing solutions.

According to another embodiment depicted in FIG. 2, the extraction of halide ions is carried out discontinuously. In this device, a single pump 5 and three-way valves 9,9' are used, enabling the flow of liquid to be directed in the desired direction. As before, the used fixing bath, with silver removed, is stored in a tank 1 where the fixing or fixing/bleaching solution is diluted, prior to passing into the first membrane, with a volume of water between 0.1 and 10 times the volume of solution to be treated. Obviously, the quantity of water added for dilution can be calculated by a computer, not depicted, the water inlet being controlled by this computer. The diluted solution is then sent by means of a pump 5 and valves 9,9' to the first nanofiltration membrane 2. After passing through the first nanofiltration membrane 2, the retentate is recirculated into the tank containing the fixing bath 1 as before, and the permeate is sent to a storage tank 8. It is then directed to the second nanofiltration membrane 3 by means of the pump 5 and valves 9,9'. The permeate from the second membrane 3 is discharged into the drainage system 7 and the retentate is sent back to the tank 8. On completion of the treatment, the contents of the tanks 1 and 8 are mixed for re-use as a regenerated fixing bath.

Figure 3:
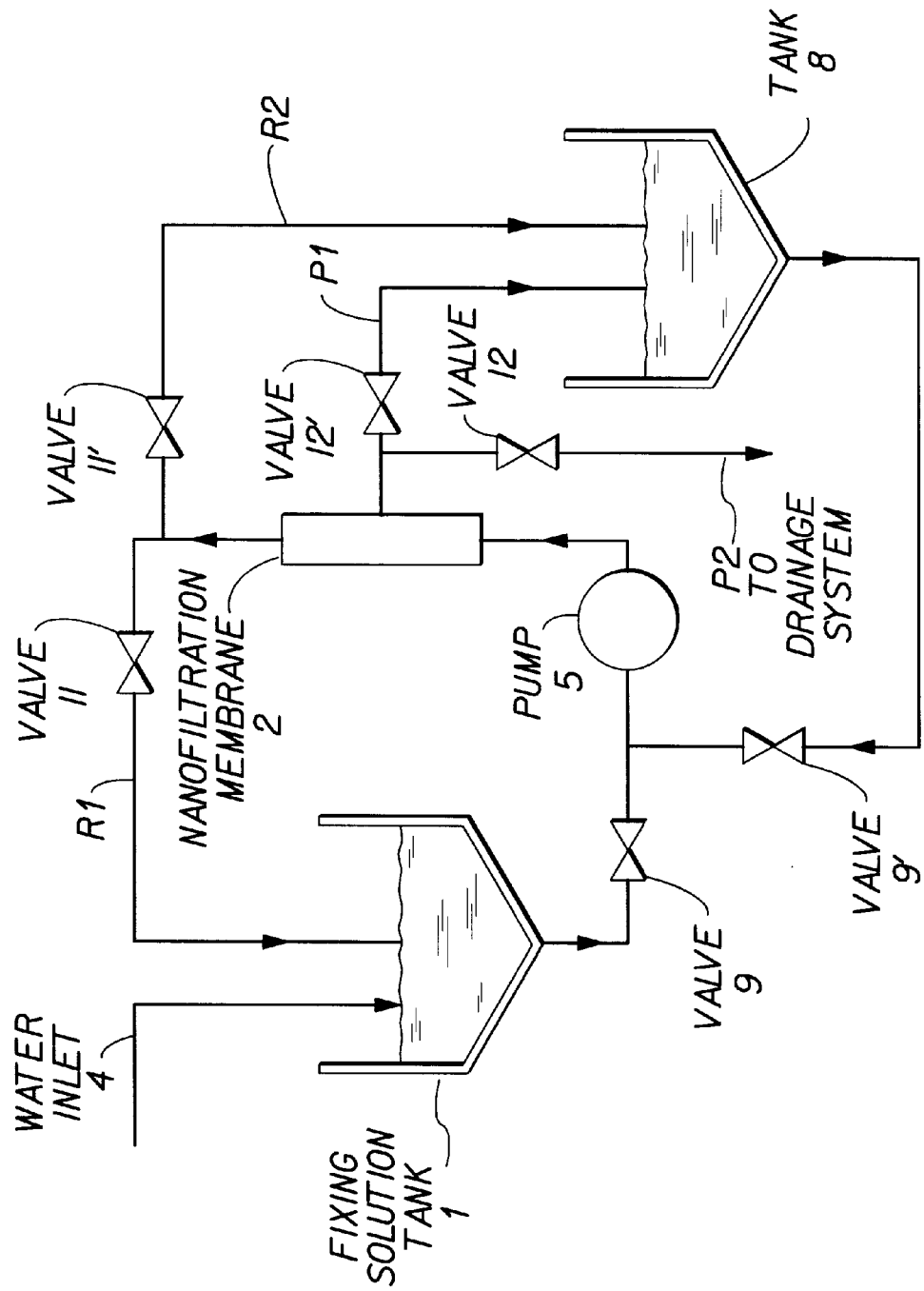
FIG. 3 depicts yet another embodiment of the device according to the present invention.

FIG. 3, to which reference is now made, illustrates schematically a third embodiment, according to which the same membrane is used for the two nanofiltration steps. During the first step (valve 9 open, valve 9' closed), after dilution of the solution (water inlet 4), the membrane 2 is used in diafiltration mode, the permeate P1, with a high concentration of halide ions and low in thiosulphate, is directed to the tank 8 (valve 12 closed, valve 12' open). The retentate R1, with a high concentration of thiosulphate and low in halide ions, is recirculated into the tank 1 (valve 11 open, valve 11' closed). This first step is continued until the concentration factor (VCF) is typically between 2 and 4, and preferably 3. Next, in the second step (valve 9 closed, valve 9' open), the contents of the tank 8 are recirculated continuously through the membrane 2 used in concentration mode. The permeate P2, mainly containing water and halide ions, is discharged into the drainage system (valve 12 open, valve 12' closed). The retentate R2, with a high concentration of thiosulphate, is sent back to the tank 8 (valve 11 closed, valve 11' open) until the concentration factor is typically between 5 and 10, and preferably 6.

By way of indication, during the first step, the retention rate of the membrane 2 (determined in concentration mode for a permeate flow of 2 l/h/m$^2$) is lower than −500 for the halides and higher than 30 for the other substances in solution (thiosulphate, sulphite, sulphate, Ag). During the second step, the retention rate of the membrane 2 (determined in concentration mode for a permeate flow of 6.7 l/h/m$^2$) is lower than −500 for the halides and higher than 60 for the other substances in solution (thiosulphate, sulphite, sulphate, Ag).

The latter solution is particularly advantageous in that it enables the same nanofiltration membrane 2 to be used for the two steps of the process, thus substantially reducing the cost of the system.

The invention is described in detail in the following examples.

EXAMPLES

In all the examples, the used fixing solution has the following composition:

| | |
|---|---|
| Ammonium thiosulphate | 0.36 mol/l |
| Sodium sulphite | 1.03 mol/l |
| Ammonium metabisulphite | 0.06 mol/l |
| Bromide* | 0.12 mol/l |
| Iodide* | 0.0063 mol/l |
| Silver nitrate | 0.0093 mol/l |
| Acetic acid | 0.038 mol/l |
| Soda for adjusting the pH to | 6.8 |

*The bromide and iodide come from the treated emulsions and are associated with alkali metals.

In Example 1 below, which corresponds to U.S. Ser. No. 08/691,198, described hereinbefore, a nanofiltration module comprising an MPT 31 tubular organic membrane marketed by Kyriat Weizmann Ltd. (Membrane T) and an NF 45 spiral organic membrane marketed by Filmtec Corporation (Membrane S) are used, whose characteristics are given in Table 1:

TABLE 1

| | | Membrane T | Membrane S |
|---|---|---|---|
| CHARACTERISTICS | | | |
| Membrane surface area (m$^2$) | | 0.05 | 2.21 |
| Maximum pressure (10$^2$ kPa) | | 40 | 41 |
| Retention rate % | | | |
| MgSO$_4$ 2 g/l | (896 kPa) | — | 98 |
| Glucose 5% | (3,034 kPa) | 65 | — |
| Glucose 10% | (1,034 kPa) | — | 91 |
| NaCl 20 g/l | (896 kPa) | — | 20 |
| NaCl 0.2% | (3,034 kPa) | 30 | — |

TABLE 1-continued

| | Membrane T | Membrane S |
|---|---|---|
| OPERATING CONDITIONS | | |
| Temperature (° C.) | 25 | 25 |
| pH | 7 | 7 |
| Flow rate (l/h) | 16.5 | 75 |

In the other examples only NF 45 spiral organic membranes marketed by FILMTEC CORPORATION are used.

Example 1 (Comparison)

In this example, the tubular membrane and spiral membrane are associated. The tubular membrane is used in concentration mode and the spiral membrane in diafiltration mode, the quantity of water being added all at once, at the start.

In this example, 30 liters of fixing solution are treated over a period of 370 minutes with the tubular membrane at a pressure of 30.10$^2$ kPa. The concentration factor is 3. Twenty liters of permeate are obtained.

20 liters of water are added to 20 liters of this permeate (the dilution factor is 2) and the diluted permeate is sent to the second spiral membrane. The operation is carried out at a pressure of 35.10$^2$ kPa. The operation is stopped when the volume of permeate from the second membrane has reached 20 liters. The concentration factor is 2.

These operating conditions are shown in Table 2.

TABLE 2

| Membrane | Time (mins) | Jp (l/h/m$^2$) | $V_{per}$ | VCF | VDF |
|---|---|---|---|---|---|
| TM | 370 | 25.2 | 20 | 3 | — |
| SM | 38 | 6.5 | 20 | 2 | 2 |

The yield of the separation is calculated by adding the retentates of the two membranes and taking into consideration the concentration factor for the tubular membrane and the dilution and concentration for the spiral membrane.

The reduction in the concentration of the various constituents of the fixing bath is as follows:

| | |
|---|---|
| Silver | 5.1% |
| Thiosulphate | 8.2% |
| Sulphite + sulphate | 23.3% |
| Iodide | 61.5% |
| Bromide | 59.2% |

As clearly shown, the reduction in thiosulphate in the regenerated solution is around 10%. In addition, around 40% of iodide ions and 40% of bromide ions are left in the solution.

Example 2 (Comparison)

In this example, a spiral membrane (SM) is used in concentration mode in the first step and a spiral membrane (SM) in diafiltration mode in the second nanofiltration step, adding the quantity of water all at once at the start.

In this example, 30 liters of fixing solution are treated for a period of 240 minutes with the spiral membrane at a pressure of 35.10$^2$ kPa. The concentration factor is 1.9. 14.5 liters of permeate are obtained.

14.5 liters of regenerated water are added to 14.5 liters of this permeate and the diluted permeate is sent to the second spiral membrane. The operation is carried out at a pressure of 35.10² kPa. The operation is stopped when the volume of permeate from the second membrane is equal to 21.75 liters. The dilution factor is 2. The concentration factor by volume is 4. The retentates of the first and second steps are mixed to form a volume of regenerated fixative of 22.75 liters.

These operating conditions are shown in Table 3.

TABLE 3

| Membrane | Time (mins) | Jp (l/h/m²) | $V_{per}$ | VCF | VDF |
|---|---|---|---|---|---|
| SM | 240 | 1.1 | 14.5 | 1.9 | — |
| SM | 32 | 5.4 | 21.75 | 4 | 2 |

The reduction in the concentration of the various constituents of the fixing bath is as follows:

| Silver | 2.3% |
|---|---|
| Thiosulphate | 10.1% |
| Sulphite + sulphate | 22.9% |
| Iodide | 67.0% |
| Bromide | 64.9% |

As in Example 1, the thiosulphate reduction rate is of the order of 10%. It has been possible to extract only around 65% of the bromide ions and 65% of the iodide ions from the fixing solution.

Example 3 (Invention)

In this example, a spiral membrane (SM) in diafiltration mode is used in the first step and a spiral membrane (SM) in concentration mode in the second step of nanofiltration.

In the first step the fixing solution is diluted using a dilution factor of 2.

In this example, 34.5 liters of used fixing solution (to which 34.5 liters of regenerated water have been added) are treated for a period of 230 minutes with the spiral membrane at a pressure of 35.10² kPa. The concentration factor is 3. 46 liters of permeate are obtained.

The permeate obtained in the first step is sent to the second spiral membrane in concentration mode. The operation is carried out at a pressure of 35.10² kPa for a period of 40 minutes. The operation is stopped when the volume of permeate from the second membrane is equal to 38.3 liters. The concentration factor by volume is 6. The retentates from the first and second steps are mixed to form a volume of regenerated fixative of 30.7 liters.

These operating conditions are shown in Table 4.

TABLE 4

| Membrane | Time (mins) | Jp (l/h/m²) | $V_{per}$ | VCF | VDF |
|---|---|---|---|---|---|
| SM | 230 | 2 | 46 | 3 | 2 |
| SM | 40 | 6.7 | 38.3 | 6 | — |

The reduction in concentration of the various constituents of the fixing bath is as follows:

| Silver | −8.1% |
|---|---|
| Thiosulphate | −14.2% |
| Sulphite + sulphate | 27.4% |
| Iodide | 90.0% |
| Bromide | 88.0% |

The minus sign for the thiosulphate reduction rate shows that the final concentration of thiosulphate is higher than the initial concentration, with an extraction rate for the iodide and bromide ions around 90%, and this without the reduction in thiosulphate as in Example 2. With the set-up in Example 1 such extraction rates could be obtained only at the cost of a thiosulphate reduction rate of around 20%.

In addition, tests show that the fixing solutions regenerated according to the invention afford a substantial reduction in fixing time as compared with the fixing time required with fixing solutions regenerated according to the method described in application FR 95 09897. Typically, the fixing time required with the fixing solution regenerated according to the invention is approximately equal to the fixing time required with a fresh fixing solution.

Finally, the residual tints (notably cyan and magenta) disappear after a period of time approximately equal to the time necessary for residual tints to disappear with a fresh fixing solution. For the fixing solutions regenerated according to the method of U.S. Ser. No. 08/691,198, described hereinbefore, this time is substantially longer.

It is to be understood that various other changes and modifications may be made without departing form the scope of the present invention, the present invention being limited by the following claims.

PARTS LIST 1 tank
2 membrane
3 membrane
4 inlet
5,6 pump
7 drainage system
8 storage tank
9,9' valves
11,11' valves

What is claimed is:

1. A method for regenerating a seasoned aqueous photographic fixing or bleaching/fixing solution containing thiosulfate ions, other substances and a high concentration of halide ions, said method having a step of recovering the silver ions contained in the aqueous solution and comprising the steps of:

a) diluting said fixing or bleach/fixing solution with a volume of water between 0.1 and 10 times the volume of the solution;

b) subjecting said diluted fixing or bleaching/fixing solution to a first step of nanofiltration, at a low flow rate and concentration factor, so as to form a retentate with a high concentration in thiosulfate ions and said other substances and low in halide ions, and a permeate with a high concentration of halide ions and low in thiosulfate ions and said other substances; and c) subjecting the permeate produced by the first nanofiltration step to a second nanofiltration step at a flow rate and concentration factor higher than those used in step b), so as to form a retentate with a high concentration in thiosulfate ions and said other substances and low in halide ions and a permeate substantially containing none of the thiosulfate ions and said other substances.

2. The method of claim 1, in which the concentration factor of step b) is between 2 and 4.

3. The method of claim 2 wherein the concentration factor of step b) is 3.

4. The method of claim 1, in which the concentration factor of step c) is between 5 and 10.

5. The method of claim 3 wherein the concentration factor of step c) is 6.

6. The method of claim 1, in which the retentates generated during the first and second nanofiltration steps are recirculated continuously into a first tank containing said fixing or bleaching/fixing solution so as to form said regenerated aqueous photographic fixing or bleaching/fixing solution and the permeate of the second membrane is discharged.

7. The method of claim 1, in which the retentate (R1) generated during the first nanofiltration step is recirculated into a first tank containing said diluted fixing or bleaching/fixing solution, the permeate (P1) generated during said first step is discharged to a second tank and used during the second nanofiltration step, the retentate (R2) generated during the second nanofiltration step is recirculated into said second tank, and the permeate (P2) generated during said second step is discharged.

8. The method of claim 7, in which the retentate (R2) generated during step c) provided in said second tank is added to the retentate (R1) generated during step b) provided in said first tank so as to form a regenerated aqueous photographic fixing or bleaching/fixing solution.

9. A method according to claim 8, in which the concentration of the said other substances in the said regenerated aqueous photographic fixing or bleaching/fixing solution is adjusted according to the concentration factors of steps b) and c).

10. The method of claim 1, in which said first nanofiltration step is implemented by means of a nanofiltration membrane having a rate of retention of the thiosulfate ions in solution higher than 30 and a rate of retention of the halide ions lower than −500 when used with a permeate flow rate of 2 $l/h/m^2$.

11. The method of claim 1, in which step b) is implemented by means of a nanofiltration membrane having a rate of retention of the thiosulfate ions in solution higher than 60 and a rate of retention of the halide ions lower than −500 when used with a permeate flow rate of 6.7 $l/h/m^2$.

12. A method according to claim 1, in which said steps a) and b) are implemented by means of a spiral organic nanofiltration membrane (SM).

* * * * *